United States Patent [19]

Kato et al.

[11] 4,392,638

[45] Jul. 12, 1983

[54] VEHICLE SUSPENSION DEVICE

[75] Inventors: Tetsuo Kato, Yokohama, Japan; Naoki Makita, Southfield, Mich.

[73] Assignee: Tokico Ltd., Kanagawa, Japan

[21] Appl. No.: 252,601

[22] Filed: Apr. 9, 1981

[51] Int. Cl.³ .............................................. F16F 9/08
[52] U.S. Cl. ............................ 267/64.24; 188/322.12
[58] Field of Search .................. 188/322.12, 322.16, 188/322.19; 267/64.23, 64.24, 64.27

[56] References Cited

FOREIGN PATENT DOCUMENTS

| 47-48833 | 12/1972 | Japan | 267/64.24 |
| 1012982 | 12/1965 | United Kingdom | 267/64.24 |
| 1027155 | 4/1966 | United Kingdom | 267/64.24 |

Primary Examiner—Duane A. Reger
Attorney, Agent, or Firm—Wenderoth, Lind & Ponack

[57] ABSTRACT

A vehicle suspension device includes a hydraulic damper including a vertical cylinder and a piston rod slidably extending out of the cylinder through the upper end thereof, and an air spring unit including a flexible tubular wall portion member having an inner wall mounted on the cylinder, an outer wall portion mounted on a tubular support member secured to the extending end of the piston rod and a rolling wall portion. A cylindrical housing is rotatably and sealingly mounted on the upper end of the cylinder and extends along the outer circumference of the cylinder, and the free end of the inner wall portion of the flexible tubular wall is secured to the upper end of the housing.

7 Claims, 2 Drawing Figures

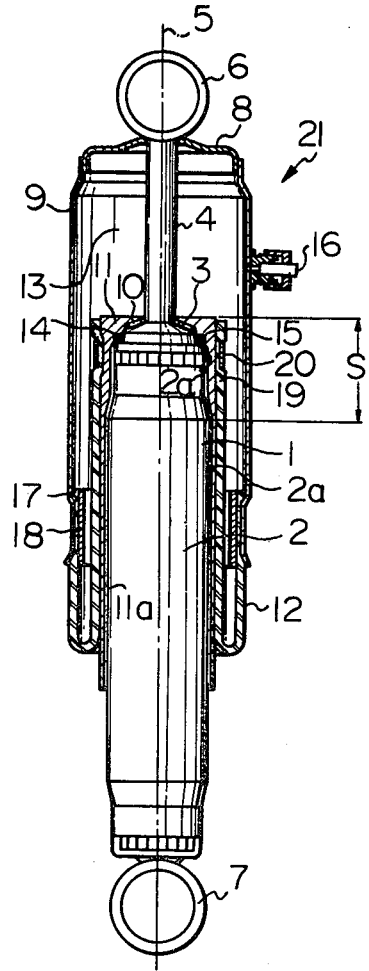
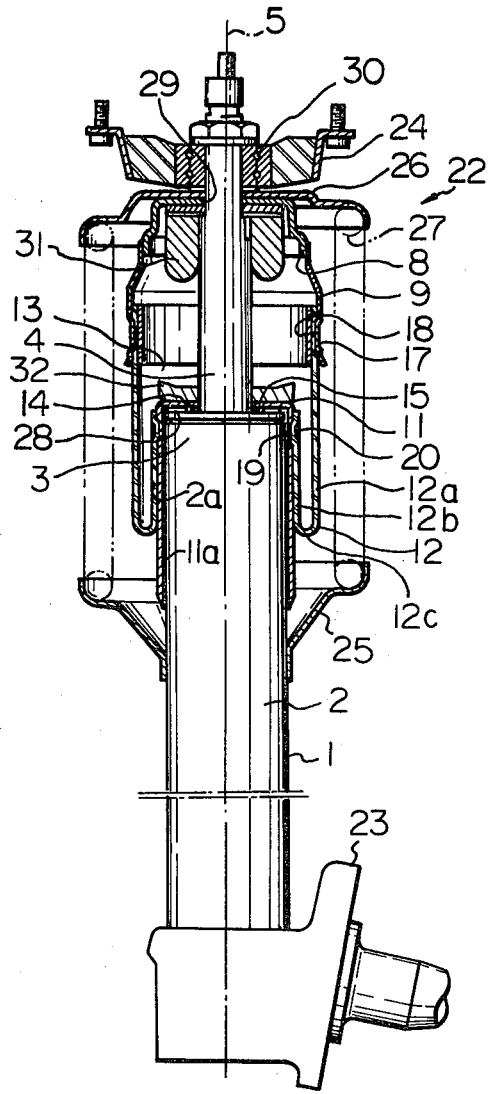

VEHICLE SUSPENSION DEVICE

BACKGROUND OF THE INVENTION

This invention relates to a vehicle suspension device for use in vehicles such as passenger cars, trucks or the like and, particularly to a vehicle suspension device of the type including a hydraulic damper including a cylinder and a piston rod extending outwardly of the cylinder through one end of the cylinder, and an air spring unit including a flexible tubular wall member and receiving therein pressurized gas such as air.

Conventionally, the flexible tubular wall member has an inner tubular wall portion the free end of which is directly secured to the cylinder of the hydraulic damper, an outer tubular wall portion surrounding at least a part of the inner tubular wall and the free end of which is secured to a skirt portion of a cup-shaped member secured to the extending end of the piston rod, and a rolling wall portion formed between the outer and inner wall portions. However, in securing the inner wall portion of the tubular wall member to the outer circumference of the cylinder of the hydraulic damper, the cylinder will be deformed, thereby impairing the function of the hydraulic damper. Further, the tubular wall member is sometimes secured to the cylinder and the cup-shaped member in a twisted condition with respect to the longitudinal axis, thereby impairing the durability of the tubular wall member. Further, in some cases, the free end of the inner wall portion of the tubular wall member is secured to a reduced diameter upper end portion of the cylinder, and the tubular wall member extends along the outer surface of the cylinder which inclines relative to the longitudinal axis of the cylinder, thereby impeding the smooth rolling movement of the tubular wall member.

SUMMARY OF THE INVENTION

An object of the present invention is to solve the problems aforementioned and, according to the invention, a cylindrical housing is mounted on the cylinder to surround a part of the outer circumference of the cylinder of the hydraulic damper, and the free end of the inner tubular wall portion of the flexible wall member is secured to the housing so that the inner tubular wall portion extends along the cylindrical outer surface of the housing.

Preferably, the housing is rotatably and sealingly mounted on the cylinder of the hydraulic damper.

The invention will be explained further in conjunction with the attached drawings exemplifying two embodiments of the invention.

BRIEF DESCRIPTION OF THE DRAWINGS

In the drawings:

FIG. 1 is a partially sectional elevational view of a vehicle suspension device according to the invention, and FIG. 2 is a view similar to FIG. 1 but showing a second embodiment of the invention.

DESCRIPTION OF THE PREFERRED EMBODIMENT

A vehicle suspension device 21 shown in FIG. 1 comprises a hydraulic damper 1 including a cylinder 2 and a piston rod 4 extending outwardly of the cylinder 2 through one end portion 3 of the cylinder 2. As shown in the drawing, the diameter of the end portion 3 is reduced as compared with the major portion of the cylinder 2. There is provided on the extending end of the piston rod 4 a mounting ring 6 for mounting the piston rod 4 of the hydraulic damper 1 on such as a body of a vehicle, and a mounting ring 7 is secured to the lower end of the cylinder 2 to mount the cylinder 2 on such as a wheel of the vehicle. A cap member 8 is also secured to the extending end of the piston rod 4 and a rigid supporting tube 9 is secured to the cap member 8 to extend downwardly therefrom. The cap member 8 and the supporting tube 9 constitute a cylindrical support member as defined herein.

According to the invention, a cylindrical housing 11 is fitted on the upper portion of the cylinder 2 and extends downwardly from the upper end portion 3 to cover the major portion of the outer circumference of the cylinder 2. The cylindrical housing 11 is formed of a rigid material and has a generally uniform outer diameter, and an inner peripheral surface generally conforming with that of the outer surface 2a of the cylinder 2 but being spaced therefrom by a small clearance 11a. A bearing 10 is provided between the cylinder 2 and the housing 11 so that the housing 11 can rotate around the axis 5 of the cylinder 2. Preferably, the bearing 10 is a needle roller bearing, a ball bearing or a plane bearing formed of a synthetic resin. An O-ring 15 is also provided in a recess 14 between the cylinder 2 and the housing 11.

A flexible tubular wall member 12 is secured to the housing 11 and to the cylindrical support member 8, 9 to form a pressurized air chamber 13. The tubular wall member 12 is formed of a flexible material such as rubber, and consists of an outer wall portion 12a, an inner wall portion 12b and a rolling wall portion 12c formed between the outer and inner wall portions (see FIG. 2). One end of the tubular wall portion member 12 or the free end 17 of the outer wall 12a is secured to the inner peripheral surface of the cylindrical support member 8, 9 by utilizing a ring 18, and the other end of the tubular wall member 12 or the free end 19 of the inner wall portion 12b is secured to the upper end of the outer circumferential surface of the housing 11 by utilizing a ring 20. Preferably, a radially inward force is applied on the ring 20 for tightly pressing the tubular wall member 12 against the housing 11.

A piping 16 is connected to the pressurized air chamber 13 to supply or exhaust pressurized air into or from the chamber 13. The piping 16 is adapted to be connected with a source of pressurized air (not shown) through a suitable valve (not shown).

The hydraulic damper 1 may be of any desired type such as a single tube type or a dual tube type and, therefore, the detailed description thereof is omitted.

In the vehicle suspension device 21 according to the invention, the tubular wall member 12 is secured to the housing 11 by utilizing the ring 20. However, the pressing force applied on the ring 20 is received by the rigid housing 11 and is not transmitted to the cylinder 2, and thus, it is possible to avoid deformation of the cylinder 2 which would impair the function of the hydraulic damper 1. The housing 11 can rotate freely around the cylinder 2 in assembling the suspension device 21, and thus, the tubular wall member 12 is not secured to the support member 8, 9 and the housing 11 in a twisted condition. Further, the housing 11 has a uniform outer circumference, and thus, the inner wall portion 12b of the tubular wall member 12 is smoothly guided along the housing 11. Further, the housing 11 surrounds and covers the upper end portion of the cylinder 2. Thus, as compared with the case wherein the upper end portion of the cylinder 2 has a reduced diameter as shown in FIG. 1 and the upper end of the inner wall portion 12b is secured to the cylinder 2 at a location downwardly of the reduced diameter portion, it is possible to locate the upper end 19 of the inner wall portion 12b further upwardly by a distance S, thereby reducing the overall length of the tubular wall member 12.

FIG. 2 shows a second embodiment of the invention, wherein parts corresponding to those of the first embodiment are depicted by the same reference numerals and a detailed description thereof is omitted. In FIG. 2, a vehicle suspension device 22 according to the invention comprises a mounting member 23 securing the lower end of the cylinder 2 of the hydraulic damper to a steerable wheel (not shown), and the upper end of the piston rod 4 is secured to a body of a vehicle (not shown) through a mounting member 24 having an anti-friction bearing 30. The cylinder 2 is rotatable around the axis 5 of the cylinder relative to the body of the vehicle. A coil spring 27 acts between a retainer 25 secured to the cylinder 2 and a spring seat 26 secured to the extending end of the piston rod 4. The spring 27 cooperates with pressurized gas enclosed in the chamber 13 to suspend the body of the vehicle and performs the damping function cooperating with the hydraulic damper 1. Further, the spring 27 transmits the rotating force between the cylinder 2 and the piston rod 4. In this embodiment, a bearing 28 is disposed between the upper end surface of the cylinder 2 and the housing 11, and a seal ring 15 is provided between the cylinder 2 and the housing 1, and a seal ring 29 seals the upper end of the chamber 13. Further, in this embodiment, a bumping rubber 31 and a bumping rubber receiving member 32 are provided in the chamber 13.

As described heretofore, the flexible tubular member can, according to the invention, be mounted on the suspension device in a substantially untwisted condition, so that the reliability of the tubular member can be improved. Further, the housing can effectively prevent the deformation of the cylinder.

What is claimed is:

1. A vehicle suspension device comprising:
   a hydraulic damper including a cylinder and a piston rod extending outwardly of one end of said cylinder;
   a cylindrical housing mounted on said one end of said cylinder and surrounding a part of the outer circumference of said cylinder;
   a cylindrical support member having a closed end attached to the extending end of said piston rod;
   a flexible tubular wall member having a first end connected to said support member and a second end connected to said housing, said wall member, said housing and said support member defining an air chamber; and
   means for enabling said housing to rotate relative to said cylinder about a longitudinal axis of said damper, and thereby for preventing twisting of said wall member, said means comprising a bearing supporting said housing on said cylinder.

2. A vehicle suspension devices as claimed in claim 1, wherein said bearing is provided between said cylinder and said one end of said housing, and further comprising a seal ring provided between said housing and said cylinder.

3. A vehicle suspension device as claimed in claim 1, wherein said piston rod extends vertically upwardly of said cylinder, and said flexible tubular wall member is connected to the upper end of said housing.

4. A vehicle suspension device as claimed in claim 1, wherein said housing has a smooth cylindrical outer surface.

5. A vehicle suspension device as claimed in claim 1, wherein said bearing comprises a needle roller bearing.

6. A vehicle suspension device as claimed in claim 1, wherein said bearing comprises a ball bearing.

7. A vehicle suspension device as claimed in claim 1, wherein said bearing comprises a plane bearing formed of a synthetic resin.

* * * * *